(12) United States Patent
Baumann et al.

(10) Patent No.: US 7,389,248 B2
(45) Date of Patent: Jun. 17, 2008

(54) SYSTEM, METHOD, AND PROGRAM PRODUCT FOR SELECTING A LOWER COST SUPPLIER BASED ON TOTAL COST AND FORECASTED DEMAND

(75) Inventors: Gerald W. Baumann, Surprise, AZ (US); David H. Goldstein, Boulder, CO (US); Richard A. Leavitt, Longmont, CO (US); John M. Salvadore, Boulder, CO (US); David B. Schroeder, Randolph, NJ (US); Paul A. Smith, Washingtonville, NY (US); Kirk A. Tatusko, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 10/323,163

(22) Filed: Dec. 18, 2002

(65) Prior Publication Data

US 2004/0122718 A1    Jun. 24, 2004

(51) Int. Cl.
*G06F 9/44* (2006.01)
(52) U.S. Cl. ............................................. 705/7
(58) Field of Classification Search ............... None
See application file for complete search history.

(56) References Cited

U.S. PATENT DOCUMENTS

| 5,224,034 A | * | 6/1993 | Katz et al. ............... 705/7 |
| 5,287,267 A | | 2/1994 | Jayaraman et al. |
| 5,450,317 A | * | 9/1995 | Lu et al. ............... 705/10 |
| 5,627,973 A | | 5/1997 | Armstrong et al. |
| 5,765,138 A | | 6/1998 | Aycock et al. |
| 5,771,172 A | * | 6/1998 | Yamamoto et al. ............ 705/7 |
| 5,799,289 A | * | 8/1998 | Fukushima et al. ......... 705/400 |
| 5,970,476 A | * | 10/1999 | Fahey ................... 705/28 |
| 6,009,407 A | | 12/1999 | Garg |
| 6,253,187 B1 | | 6/2001 | Fox |

(Continued)

FOREIGN PATENT DOCUMENTS

WO    WO 01/40895 A2    6/2001

OTHER PUBLICATIONS

Weber, Charles Arthur, A decision support system using multicriteria techniques for vendor selection Ohio State University, 1991.*

(Continued)

*Primary Examiner*—Scott L Jarrett
(74) *Attorney, Agent, or Firm*—John A. Pivnichny; Hoffman, Warnick & D'Alessandro LLC (57) ABSTRACT

Under the present invention, componentized costs for providing/producing an item are collected from a plurality of suppliers. The componentized costs include the fixed and variable costs associated with raw materials and production for providing the item according to various specifications and order quantities. When a buyer wishes to obtain the item, a particular order specification and a demand forecast for the item will be provided. Based on the particular specification, the demand forecast and the componentized costs, an optimal order quantity for the item will be calculated. Then, a total (lifetime) cost for providing the item will be calculated for each supplier. The supplier having the lowest total cost for the projected lifetime of the item will be identified to the buyer.

20 Claims, 3 Drawing Sheets

U.S. PATENT DOCUMENTS

| | | | |
|---|---|---|---|
| 6,292,894 B1 | 9/2001 | Chipman et al. | |
| 6,308,166 B1 * | 10/2001 | Breuker et al. | 705/400 |
| 6,415,277 B1 * | 7/2002 | Klatt et al. | 707/1 |
| 6,647,374 B2 * | 11/2003 | Kansal | 705/37 |
| 6,671,673 B1 * | 12/2003 | Baseman et al. | 705/7 |
| 6,826,538 B1 * | 11/2004 | Kalyan et al. | 705/7 |
| 7,050,874 B1 * | 5/2006 | Tenorio | 700/107 |
| 7,113,959 B1 * | 9/2006 | Klatt et al. | 707/104.1 |
| 2002/0007324 A1 * | 1/2002 | Centner et al. | 705/26 |
| 2002/0023060 A1 * | 2/2002 | Cooney et al. | 705/400 |
| 2002/0026392 A1 * | 2/2002 | Shimizu et al. | 705/29 |
| 2002/0103725 A1 * | 8/2002 | Martin et al. | 705/28 |
| 2002/0174000 A1 * | 11/2002 | Katz et al. | 705/7 |
| 2003/0120477 A1 * | 6/2003 | Kruk et al. | 704/2 |
| 2003/0172008 A1 * | 9/2003 | Hage et al. | 705/28 |
| 2003/0184588 A1 * | 10/2003 | Lee | 345/772 |
| 2003/0187808 A1 * | 10/2003 | Alfred et al. | 705/400 |
| 2004/0006503 A1 * | 1/2004 | Jarvis | 705/10 |

OTHER PUBLICATIONS

Chaudhry, Sohail S. et al., Vendor selection with price breaks European Journal of Operational Research, vol. 70, No. 1, Oct. 8, 1993, Abstract.*

Weber, Charles A. et al., Supplier selection using multi-objective programming: A decision support system International Journal of Physical Distribution & Logistics, vol. 23, No. 2, 1993.*

Ellram, Lisa, A taxonomy of total cost of ownership models Journal of Business Logistics, 1994.*

Bender et al., Improving Purchasing Productivity at IBM with Normative Decision Support System Interfaces, vol. 15, No. 3, May-Jun. 1985, pp. 106-115.*

Smytka, Daniel L. et al., Total Cost Supplier Selection Model: A Case Study International Journal of Purchasing and Materials Management, vol. 29, No. 1, Winter 1993, pp. 42-49.*

Ellram, Lisa M. et al., Total Cost of Ownership: A Key Concept in Strategic Cost Management Decisions Journal of Business Logistics, vol. 19, No. 1, 1998, pp. 55-84.*

Jayaraman, Vaudyanathan et al., Supplier Selection and Order Quantity Allocation: A Comprehensive Model Journal of Supply Chain Management, vol. 35, No. 2, Spring 1999, pp. 50-58.*

Degraeve, Zeger et al., Effectively Selecting Suppliers Using Total Cost of Ownership Journal of Supply Chain Management, vol. 35, No. 1, Winter 1999, pp. 5-10.*

Degraeve, Zeger et al., A Mathmatical Programming Approach for Procurement Using Activity Based Costing Journal of Business Finance & Accounting, vol. 27, No. 1, Jan./Mar. 2000, pp. 69-98.*

Strategic Sourcing: Key to Competitiveness in the Internet Economy Aberdeen Group, Inc., Sep. 2000.*

Ghodsypour S.H. et al., The total cost of logistics in supplier selection, under conditions of multiple sourcing, multiple criteria and capacity constraint, International Journal of Production Economics, vol. 73, 2001, pp. 15-27.*

Bhutta, Khurrum S. et al., Supplier selection problem: a comparison of total cost of ownership and analytic hierarchy process approaches, Supply Chain Management, vol. 7, No. 3/4, 2002, pp. 126-135.*

Kuchanur, Muthukumar Ponnusamy, Strategic Supplier Selection Model Texas A&M University, 2002, AAT 1411848, Abstract.*

Laseter, Timothy M., Balanced Sourcing Booz Allen & Hamilton, Inc., 1998, ISBN: 0-7879-4443-2.*

Demand Forecasting Clarkson Group, 2000.*

Kasilingam, Raja G. et al., Selection of Vendors—A Mixed Integer Programming Appoach Computers in Industrial Engineering, vol. 31, No. 1/2, 1996, pp. 347-350.*

Rosenblatt, Meir J. et al., Note. An Acquisition Policy for a Single Item Multi-Supplier System Management Science, vol. 44, No. 11, Nov. 1998, pp. S96-S100.*

Jayaraman, V. et al., Supplier Selection and Order Quantity Allocation: A Comprehensive Model The Journal of Supply Chain Management, vol. 35, No. 2, Spring 1999, pp. 50-58.*

Piasecki, Dave, Optimizing Economic Order Quantity (WOQ) Intentory Operations, 2001.*

Basnet, Chuda et al., Inventory Lot Sizing with Supplier Selection 2002.*

Akinc, Umit, Selecting a set of vendors in a manufacturing environment Wake Forest University, Dec. 1992, Abstract.*

Sarker, Bhaba R. et al., An Optimal Batch Size for a Production System Operating under a Fixed-Quanity, Periodic Delivery Policy, Journal of the Operational Research Society, vol. 45, No. 8, 1994, pp. 891-900.*

IBM Sells it purchasing prowess Purchasing, vol. 127, No. 4, Sep. 16, 1999, p. 48.*

Roan, Jinshyang et al., Joint determiniation of process mean, production run size and material order quantity for a container filling process, International Journal of Production Economics, vol. 63, 2000, pp. 303-317.*

Degreave, Z., Improving the efficiency of the purchasing process using total cost of ownership European Journal of Operational Research, vol. 112, No. 1, Jan. 1999, Abstract.*

Tempelmeier, Horst, A Simple Heuristic for Dynamic Order Sizing And Supplier Selection With Time Varying Data Production and Operations Management, vol. 11, No. 4, Winter 2002, pp. 499-515.*

Sllver, Edward et al., Inventory Management and Production Planning and Scheduling, Third Edition John Wiley & Sons, 1998.*

* cited by examiner

RAW MATERIALS

PRODUCTION

FIG. 3

US 7,389,248 B2

SYSTEM, METHOD, AND PROGRAM PRODUCT FOR SELECTING A LOWER COST SUPPLIER BASED ON TOTAL COST AND FORECASTED DEMAND

BACKGROUND OF THE INVENTION

1. Field of the Invention

The present invention generally relates to a method, system and program product for selecting a supplier. Specifically, under the present invention, one of a plurality of suppliers of an item is identified based the supplier offering a lowest total cost for providing the item to a buyer.

2. Background Art

As computer technology continues to advance, individuals and businesses are increasingly utilizing computer networks such as the Internet to perform everyday tasks. For example, today a potential buyer can search for and purchase various goods/services over the Internet. Typically, buyers seek to minimize spending on purchased goods and services. In the case of businesses, such savings can pass directly to bottom line profit. Traditional purchasing involves buyers seeking price quotations for all goods/services sought (e.g., either for immediate purchase or from an open contract against which future purchases are made). In many cases, the buyers choose three or four suppliers and solicit a price quotation therefrom. Unless the buyer happens to know which suppliers will present the most cost effective options, the buyer generally relies on luck soliciting from the lowest priced suppliers. In addition, in traditional purchasing methods such as this, economic purchase quantity (e.g., sometimes referred to as economic order quantity) is determined by optimizing tradeoffs between fixed costs and inventory costs. This generally assumes a perpetual life span of the goods/services purchased, and ignores the financial impact of scrap or waste for goods/services that have a finite life span.

Heretofore, various system such as SAP and MAPICS have been developed for fostering network-based purchasing. Unfortunately, such systems assume that supplier selection is determined explicitly from parameters of the goods/services sought and predetermined order volumes. Thus, the existing systems fail to address the issues that arise with goods/services having a finite life span. Moreover, the existing systems fail to determine an optimum order quantity, which can vary based on the supplier. Accordingly the existing systems fail to provide a way to truly minimize spending by identifying a supplier that has the lowest total lifetime cost.

In view of the foregoing, there exists a need for a method, system and program product for selecting a supplier. Specifically, a need exists for a system in which componentized costs for providing an item are collected from a plurality of suppliers. Another need exists for the componentized costs to be approved before they are utilized to process an order. A further need exists for a total (lifetime) cost for the item to be calculated for each of the suppliers based on a demand forecast, a particular order specification for the item and the approved componentized costs. Still yet, another need exists for the supplier having the lowest total (lifetime) cost for the lifetime of the item to be identified.

SUMMARY OF THE INVENTION

In general, the present invention provides a method, system and program product for selecting a supplier. Specifically, componentized costs for providing (i.e., producing) an item are collected from a plurality of suppliers. The componentized costs include the fixed and variable costs associated with raw materials and production (e.g., labor) for providing the item according to various order specifications and quantities. Once collected, the componentized costs are subject to approval before being used to select a supplier for fulfilling an order. The approved componentized costs can be used to generate supplier rankings and reports. When a buyer wishes to obtain an item, a particular order specification and a demand forecast for the item will be provided. The particular order specification defines the specific characteristics of the item sought by the buyer. The demand forecast is an estimated quantity of the item that the buyer will require. Based on the particular order specification, the demand forecast and the approved componentized costs, an optimal order quantity for the item will be calculated. Then, for each supplier, a total (lifetime) cost for providing the item will be calculated. The supplier having the lowest total (lifetime) cost will be identified to the buyer.

According to a first aspect of the present invention, a method for selecting a supplier is provided. The method comprises: (1) providing componentized costs for a set of suppliers, wherein the componentized costs include fixed costs and variable costs for producing an item according to various order specifications and order quantities; (2) providing a demand forecast and a particular order specification for the item; (3) calculating a total cost for providing the item for each of the set of suppliers, wherein the total costs are calculated based on the fixed costs, the variable costs, the particular order specification and the demand forecast; and (4) identifying one of the set of suppliers for fulfilling an order for the item based on the one supplier having a lower total cost for the item than the other suppliers.

According to a second aspect of the present invention, a method for selecting a supplier is provided. The method comprises: (1) receiving componentized costs from a plurality of suppliers, wherein the componentized costs include fixed costs and variable costs for producing an item according to various order specifications and order quantities; (2) providing a demand forecast and a particular order specification for the item; and (3) determining based on the particular order specification, the demand forecast and the componentized costs with which of the plurality of suppliers should an order for the item be placed so that a total cost of the item is minimized.

According to a third aspect of the present invention, a system for selecting a supplier is provided. The system comprises: (1) a supplier system for providing componentized costs for a plurality of suppliers, wherein the componentized costs include fixed costs and variable costs for producing an item according to various order specifications and order quantities; and (2) a buyer system for identifying one of the plurality of suppliers with which an order for the item should be placed so that a total cost of the item is minimized, wherein the one supplier is identified based on a particular order specification for the item, a demand forecast and the componentized costs.

According to a fourth aspect of the present invention, a program product stored on a recordable medium for selecting a supplier is provided. When executed, the program product comprises: (1) program code for providing componentized costs for a plurality of suppliers, wherein the componentized costs include fixed costs and variable costs for producing an item according to various order specifications and order quantities; and (2) program code for identifying one of the plurality of suppliers with which an order for the item should be placed so that a total cost of the item is minimized, wherein the one supplier is identified based on a particular order specification for the item, a demand forecast and the componentized costs.

Therefore, the present invention provides a method, system and program product for selecting a supplier.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for selecting a supplier. Specifically, componentized costs for providing (i.e., producing) an item are collected from a plurality of suppliers. The componentized costs include the fixed and variable costs associated with raw materials and production (e.g., labor) for providing the item according to various order specifications and quantities. Once collected, the componentized costs are subject to approval before being used to select a supplier for fulfilling an order. The approved componentized costs can be used to generate supplier rankings and reports. When a buyer wishes to obtain an item, a particular order specification and a demand forecast for the item will be provided. The particular order specification defines the specific characteristics of the item sought by the buyer. The demand forecast is an estimated quantity of the item that the buyer will require. Based on the particular order specification, the demand forecast and the approved componentized costs, an optimal order quantity for the item will be calculated. Then, for each supplier, a total (lifetime) cost for providing the item will be calculated. The supplier having the lowest total (lifetime) cost the item, will be identified to the buyer.

As used herein the term "item" is intended to refer to any good or service that can be purchased from a supplier. Although an illustrative example of the invention described below will discuss a particular good (e.g., a printed publication), the teachings of the present invention are not limited to that example. For example, the teachings described herein could be applied to selecting a supplier of compact discs.

Figure 1:
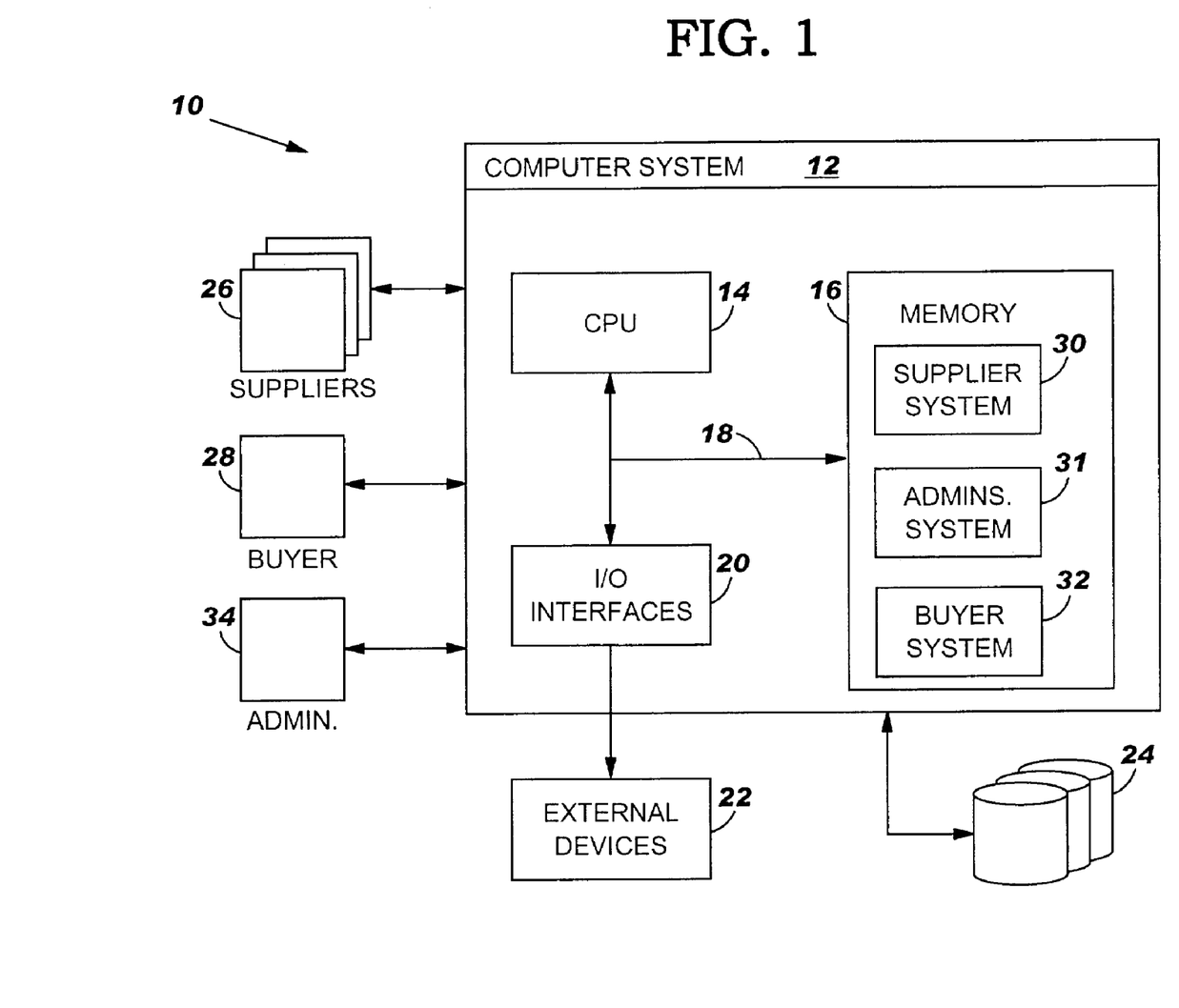
FIG. 1 depicts a system for selecting a supplier, according to the present invention.

Referring now to FIG. 1 system 10 for selecting a supplier is shown. As depicted, system 10 includes computer system 12 with which suppliers 26 and buyer 28 communicate. Computer system 12 generally comprises central processing unit (CPU) 14, memory 16, bus 18, input/output (I/O) interfaces 20 and external devices/resources 22. Computer system 10 also communicates with one or more databases 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in computer system 12 and likewise may comprise any known type of transmission link, including electrical, optical, wireless, etc. In addition, although not shown, additional components, such as cache memory, communication systems, system software, etc., may be incorporated into computer system 12.

As will be further described below, one or more databases 24 could provide storage for information under the present invention. Such information could include, for example, componentized costs, approved costs, forecast demands, specifications, inventories, etc. As such, each database 24 may include one or more storage devices, such as a magnetic disk drive or an optical disk drive. In another embodiment, databases 24 include data distributed across, for example, a local area network (LAN), wide area network (WAN) or a storage area network (SAN) (not shown).

It should be understood that although the present invention is typically utilized for purchasing items over a network such as the Internet, this need not be the case. As such, communication with computer system 12 can occur via a direct hardwired connection (e.g., serial port), or via an addressable connection in a client-server (or server-server) environment that may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. In the event suppliers 26 and/or buyer 28 access computer system indirectly, they would utilize computerized systems (e.g., personal computer, workstation, personal digital assistant, etc.) to communicate with computer system 12. Although not shown for brevity purposes, such computerized systems would typically include components (e.g., CPU, memory, etc.) similar to computer system.

Shown in memory 16 of computer system 12 are supplier system 30, administrator system 31 and buyer system 32. In general, each supplier 26 will utilize one or more interfaces provided by supplier system 30 to provide componentized costs for providing/producing an item. The componentized costs provided represent the fixed costs and the variable costs associated with raw material and production (e.g., labor) involved with providing/supplying the item according to various order specifications and quantities. Thus, the costs collected from suppliers 26 are not total costs for producing the item according to one particular specification. To this extent, the costs associated with raw material are typically collected separately from the costs associated with production. In one embodiment, the interface(s) generated by supplier system 30 can take the form of grids or tables into which each supplier 26 will enter their componentized costs according to the various order specifications and quantities.

Figure 2:
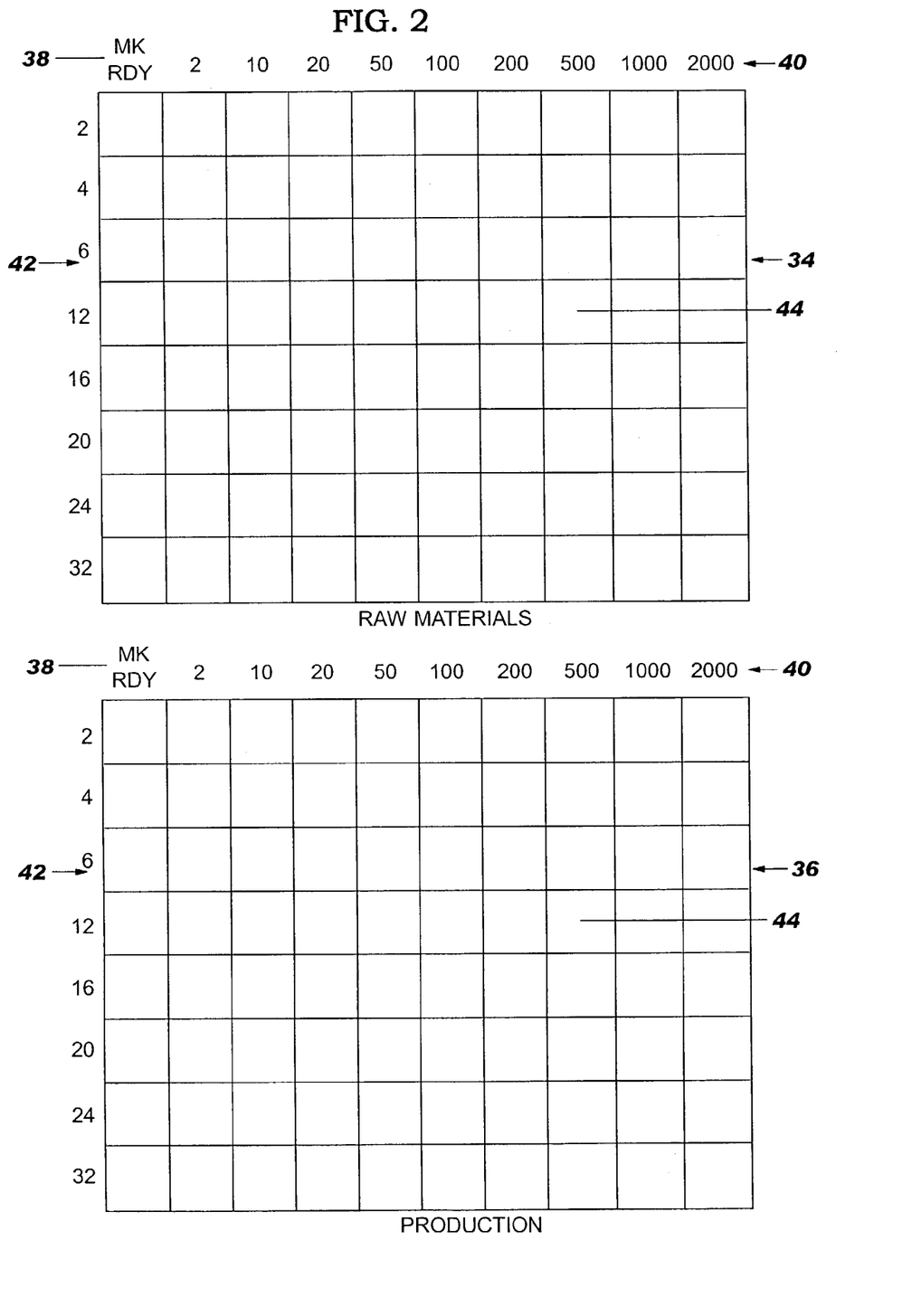
FIG. 2 depicts an exemplary interface for collecting componentized costs, according to the present invention.

Referring now to FIG. 2, exemplary grids 34 and 36 are shown. For illustrative purposes, grids 34 and 36 represent those that could be provided for collecting componentized costs from a supplier of printed publications. To this extent, grid 34 receives componentized costs associated with raw materials (e.g., paper, ink, etc.), while grid 36 receives componentized costs associated with production (e.g., labor, printing costs, etc.). Columns 40 of grids 34 and 36 represent various order quantities for the printed publication, while rows 42 represent various page counts for a printed publication. For example, field 44 corresponds to a twelve page printed publication in a quantity of 500. To this extent, additional grids could be provided to reflect order specifications other than page count (e.g., page size, colors, etc.). Columns 38 of each grid 34 and 36 are where suppliers 26 can input fixed costs for producing the printed publication. In many cases, an item will have certain setup costs that are fixed, regardless of quantity. These costs are inputted into the fields of column 38. The remaining fields of grids 34 and 36 (i.e., rows 42 of columns 40), are where suppliers 26 will input their variable costs. As known, beyond initial setup costs, the cost for producing an item can vary depending on quantity as well as various specifications (e.g., page count). Suppliers 26 will input the costs corresponding to each order quantity and page count into the fields of columns 40. For example, if a supplier has a variable cost for raw materials of $300 for 500 copies of a printed publication having twelve pages, that supplier would input $300 into field 44 of grid 34. Similarly, if 500 copies of a twelve page publication will cost an additional $200 in production costs, the supplier will input $200 in field 44 of grid 36. To the extent possible, variable costs inputted by suppliers 26 for raw materials will typically represent baseline costs. These baseline costs can be adjusted by supplier system 30 based on current market costs. Specifically, the baseline costs can be multiplied by the ratio of current market costs to the baseline costs. Thus, if current market costs for paper are twice that inputted into grid 34, the costs will be doubled to reflect the current market price of paper.

As indicated above, grids 34 and 36 are shown to illustrate only one possible implementation of the present invention. Accordingly, it should be recognized that many variations could be provided. For example, separate grids could be provided for different types of raw materials (e.g., one grid for ink and one grid for paper). To this extent, it should be appreciated that the interfaces used to collect componentized costs from suppliers could also vary depending on the item at issue.

Referring back to FIG. 1, the componentized costs will be initially stored in a staging database 24. Then, based on "approval" program code within administrator system 31 and/or administrator 34, the componentized costs can be approved. Specifically, administrator system 31 will detect any cost values that seem inaccurate. Administrator 34 will review the results and ultimately decide whether costs get approved. Approval of the costs in this manner prevents inaccurate or corrupt data from being used to select a supplier. In any event, once a supplier's componentized costs are approved, they can be promoted to a production database 24. Typically, suppliers 26 can update their cost information at any time. Since any costs suppliers 26 provide will be kept in a staging database until approved, there need not be any concern that updated costs will corrupt system 10.

Based on the approved componentized costs, administrator system 31 can generate any rankings/reports of suppliers' cost competitiveness. Typically, the rankings are readable by suppliers 26 and inform them where they rank for different aspects. For example, supplier "A" could be informed that he/she ranks fifth for high volume publications, while ranking first for low volume publications. To this extent, the present invention could encourage competition among suppliers 26. That is, suppliers 26 have an incentive to be ranked first. As will be further described below, administrator system 31 could also generate hierarchical reports that indicate which supplier will "most likely" have a best price for a particular item. This is especially useful, for example, if buyer 28 is seeking a custom item that does not fit within the particular specifications to which suppliers 26 have provided componentized costs. In this event, the hierarchical reports generated by administrator system 31 could help determine the most appropriate supplier(s) 26 to consider.

When buyer 28 wishes to purchase a printed publication, he/she will use buyer system 32 to provide (or select) a particular order specification and a demand forecast. The particular order specification sets forth all of the details for the precise printed publication desired by buyer 28 (e.g., page size, colors, page count, etc.). The demand forecast represents an initial estimate of how many (e.g., order quantity) printed publications buyer 28 will require. In one embodiment, buyer 28 can provide the particular order specification and/or the demand forecast using interfaces provided by buyer system 32. In another embodiment, the particular order specification and/or the demand forecast can be drawn from one or more databases 24. For example, buyer 28 could select a particular order specification from a group of order specifications in a specification database 24. Moreover, the demand forecast can be estimated based historical behavior as stored in a demand database. For example, if buyer 28 had ordered the same printed publication in the past, the demand forecast can be determined based on previous quantities purchased by buyer 28. When the demand forecast is based on historical behavior in this manner, a weighted average can be used to estimate weekly (or some other period) demand. In erratic demand environments, the infrequent weeks with unexpectedly high demand could be biased high. This bias can be removed by buyer system 32 by factoring (e.g., dividing) the computed average by a predefined value (e.g., 1.39).

Based on the demand forecast, a demand probability can be calculated. Specifically, in general, the actual demand is assumed to be an exponential of the demand forecast according to the following algorithm:

$$P(n)=(1/N)\exp(-n/N)$$

where N is the demand forecast, and n is the actual quantity that will be provided by a supplier over the life of the item.

Once the particular order specification and the demand forecast have been identified, an optimum order quantity will be computed (e.g., per production run) for a set (e.g., a plurality) of suppliers 26. In one embodiment, the set includes every supplier. Alternatively, the set of suppliers 26 could be chosen based on the hierarchical reports generated by administrator system 31. Thus, for example, if buyer 28 desires a custom item that does not fit within the specifications to which componentized costs were collected, only the suppliers that are "most likely" to have a best price be included in the set. In any event, the optimum demand quantity is useful because it could be the case that buyer 28 is better off ordering a different quantity of printed publications than he/she is forecasting will be used. Specifically, if the printed publication has high setup costs, but lower variable costs, buyer 28 might wish to order more publications than he/she is forecasting will be used in the event that actual demand exceeds the supply. For example, assume that the printed publication desired by buyer 28 has fixed (setup) costs of $1000 and variable (per unit) costs of $1.00. Further assume that buyer 28 is forecasting he/she will require 1000 units. Under this scenario, the publication will cost the buyer $2000. However, if the actual demand for the printed publication is actually 1001, buyer 28 will have to incur an additional $1000 in fixed costs again. Thus, buyer 28 is better off ordering up to 1999 units initially at an additional cost of $999 rather than risk falling one unit short of actual demand. Even though buyer 28 may have to scrap some of the additional units, the additional quantity will still be more cost effective. On the other hand, if the item has low setup costs (e.g., $50), but high per unit costs (e.g., $200/unit), buyer 28 could be better off ordering fewer units than is forecast to be needed. That is, buyer 28 is better off bearing the startup costs again if additional units if are needed than he/she is scrapping surplus units that were not needed.

In general, the optimum order quantity (per production run) is computed from the following algorithm:

$$no = N(2Cf/Cv/N)^{1/2}/(1+0.232(Cf/Cv/N)^{0.49})$$

where Cf are the fixed costs for a supplier, Cv are the variable costs for a supplier and N is the demand forecast.

Based on the optimum order quantity, an expected number of production runs could be computed from the following algorithm:

$$M = 1/(1-\exp(-no/N))$$

where M is the expected run quantity, no is the optimum order quantity and N is the demand forecast.

Once the optimum order quantity and expected number of runs have been computed, the total (lifetime) cost for the printed publication will be computed for each supplier in the set according to the following algorithm:

$$Ct = M(Cf + no(Cv))$$

where Ct is total (lifetime) cost, Cf are the fixed costs for a supplier, Cv are the variable costs for a supplier and no is the optimal order quantity (per production run). Accordingly, if M=1, Cf=$1000, Cv=$1.00 and no=1500 for supplier "A," the total (lifetime) cost for supplier "A" to provide the printed publication desired by buyer 28 will be $2500. The total cost is regarded as a total "lifetime" cost because it considers both how many units will be needed, and how many production runs/orders will be made.

Once buyer system 32 has computed the total costs for the set of suppliers 26, the supplier who has the lowest total cost for fulfilling the order for the printed publication will be identified to buyer 28. Buyer 28 can then select the identified supplier and order the printed publication (e.g., through buyer system 28 or manually). As indicated above, the present invention can track the performance history of buyer 28 for the printed publication. This information can be used to fine-tune the demand forecast and to provide automatic reordering services. Specifically, based on buyer 28's rate of usage of the printed publication and a current inventory of the printed publication (e.g., how many units have shipped and how many are left), buyer system 32 can adjust the demand forecast and recompute the optimal order quantity, number of production runs and total costs for each supplier. Before the inventory is expended, buyer system 32 can then reorder the printed publication from the supplier having the lowest total cost. To this extent, the supplier identified for reordering may or may not be the same supplier identified for fulfilling the initial order. If the demand forecast changed, the optimal quantity could have changed. In this case, a different supplier may be more cost effective at the new quantity.

Figure 3:
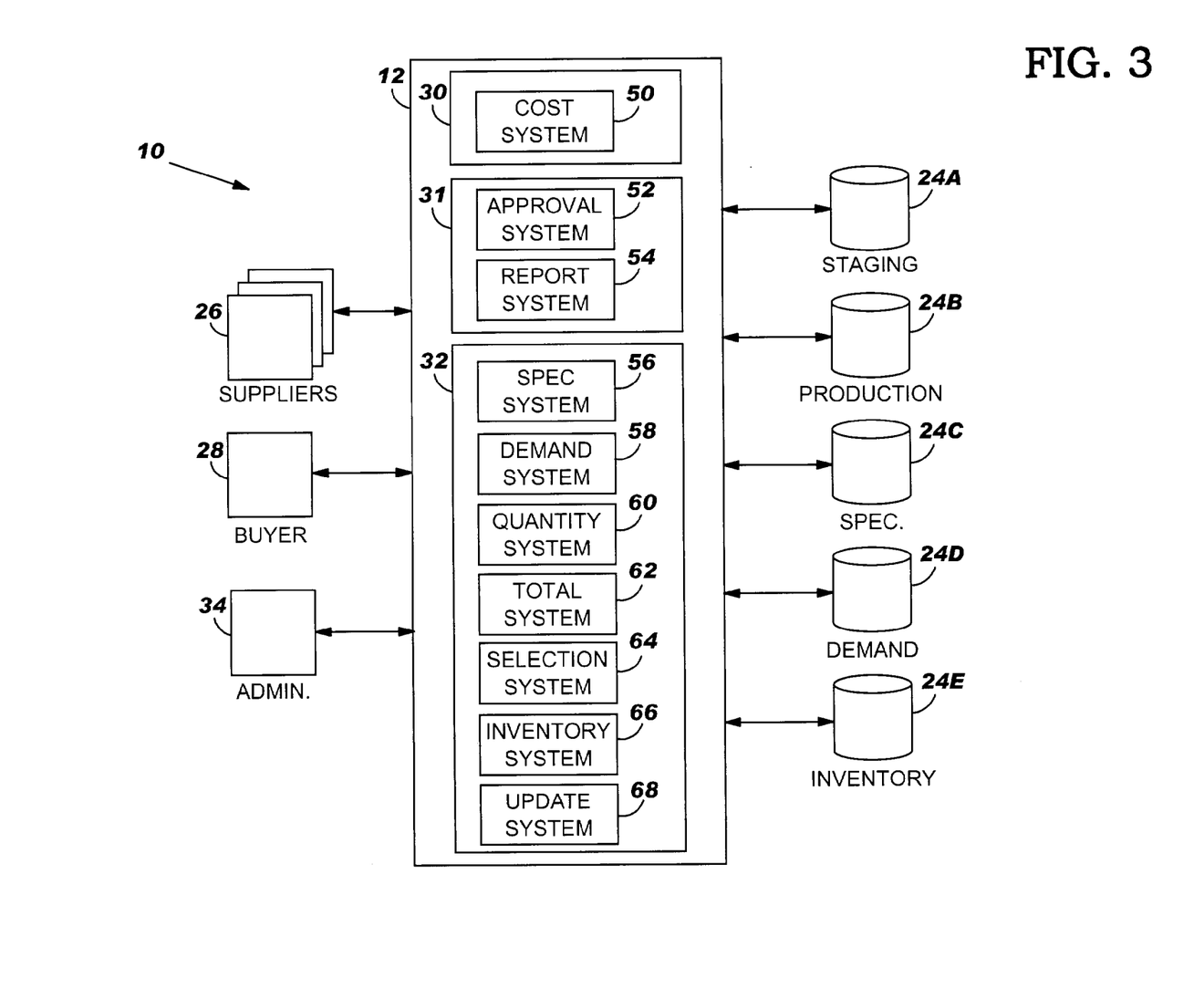
FIG. 3 a more detailed diagram of the supplier system and the buyer system of FIG. 1.

Referring now to FIG. 3, a more detailed diagram of supplier system 30, administrator system 31 and buyer system 32 are shown. As depicted: (1) supplier system 30 includes cost system 50; (2) administrator system 31 includes approval system 52 and report system 54; and (3) buyer system 32 includes specification system 56, demand system 58, quantity system 60, total system 62, selection system 64, inventory system 66 and update system 68. It should be understood that the various systems and subsystems shown in FIG. 3 are depicted as such for illustrative purposes only, and that many variations could be implemented. Specifically, the systems and subsystems have been separately shown only for describing the functions herein. It should be recognized that the functionality of the present invention could be implemented with a different quantity of systems and/or subsystems. For example, specification system 56 and demand system 58 could exist as a single system. Similarly, supplier system 30, administrator system 31 and buyer system 32 could be contained within a single "transaction" program.

As indicated above, suppliers 26 will first provide componentized costs associated with raw materials and production for providing an item (e.g., a printed publication) according to various order specifications and order quantities. Cost system 50 will provide the necessary interface (e.g., grids 34 and 36) for collecting such information. Once collected, cost system 50 will store the componentized costs in staging database 24A. As indicated above, some of the variable costs provided by suppliers 26 (e.g., for raw materials) could be average baseline costs. In this event, cost system 50 can adjust the provided baseline costs based on current market costs.

In any event, approval system 52 and/or administrator 34 will review the componentized costs for each supplier. If any costs seem inaccurate, the corresponding supplier can be contacted to provided corrected costs. If, however, the componentized costs are approved, they will be promoted from staging database 24A to production database 24B. Once in production database 24B, report system 54 can generate and output any reports to suppliers 26. Such reports can include, rankings, hierarchical reports, etc.

When buyer 28 wishes to order a specific item (e.g., printed publication), a particular order specification and demand forecast must be provided. Typically, specification system 56 will receive either a particular order specification from buyer 28 or it can access specification database 24C to provide a set (e.g., one or more) particular specifications from which buyer 28 can choose. Similarly, demand system 58 can receive the demand forecast directly from buyer 28, or it could access demand database 24D to estimate the demand forecast based on buyer 28's performance history (if any).

Once the particular order specification and the demand forecast have been provided, quantity system 60 will determine the optimal order quantity (based on the demand forecast) for a set of suppliers using the order quantity algorithm cited above. Once the optimal order quantity is determined quantity system 60 can then determine the number of production runs that will be required (based on the demand forecast and the optimal order quantity) using the production run algorithm cited above. Then, for each supplier in the set, total system 62 will calculate a total cost for the particular item (based on the optimal order quantity, the particular order specification, and the componentized costs (fixed and variable)). The total costs will be determined using the total cost algorithm cited above. After the total costs for suppliers 26 have been calculated, selection system 64 will identify the supplier having the lowest total cost to buyer 28. Buyer 28 can then communicate with that supplier to order the item.

As buyer 28 utilizes the item, inventory system 66 can track the historical behavior (e.g., rate of usage) to adjust the demand forecast, recompute total costs, and reorder the item. To this extent, inventory system could access inventory database 24E to determine how many units have shipped, how many are left and the rate at which buyer 28 is expending the units. As updates to buyer system 32 become available, update system 68 can communicate such updates to buyer 28.

It should be appreciated that the present invention could be implemented with any quantity of databases. The quantity shown herein is for illustrative purposes only. For example, order specifications and demand forecasts could be stored in a common database. It should also be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A method for selecting a supplier, comprising:
   providing componentized costs for producing a single run of an item to be purchased over a plurality of runs for a set of suppliers, wherein the componentized costs include fixed costs for setting up the run and variable costs for producing each item according to various order specifications and order quantities;
   providing a demand forecast and a particular order specification for the item;
   calculating a total cost for providing the item for each of the set of suppliers, wherein the total costs are calculated based on the fixed costs, the variable costs, the particular order specification and the demand forecast over the plurality of runs;
   identifying one of the set of suppliers for fulfilling an order for the item based on the one supplier having a lower total cost for the item than the other suppliers; and
   determining an optimal order quantity for a run of the item based on the following algorithm:

$$N(2Cf/Cv/N)^{1/2}/(1+0232(Cf/Cv/N)^{0.49})$$

where N is the demand forecast, Cf are the fixed costs and Cv are the variable costs for the particular order specification, wherein the total costs over the plurality of runs are determined based on the optimal order quantity using the following algorithm:

$$M(Cf+\text{no}(Cv))$$

where M is an expected run quantity and no is the optimum order quantity for the run.

2. The method of claim 1, further comprising:
   selecting the one supplier; and
   placing the order for the item with the one supplier.

3. The method of claim 1, wherein the step of providing componentized costs comprises:
   collecting fixed costs and variable costs associated with raw materials for providing the item according to various order quantities and order specifications;
   collecting fixed costs and variable costs associated with production for providing the item according to the various order quantities and the order specifications, wherein the fixed costs and the variable costs associated with the production are collected separately from the fixed costs and the variable costs associated with the raw materials; and
   approving the fixed costs and the variable costs associated with the raw materials and the fixed costs and the variable costs associated with the production.

4. The method of claim 3, further comprising adjusting the collected variable costs associated with the raw materials based on current market costs.

5. The method of claim 1, wherein the demand forecast is based on an initial order quantity estimate as determined by a buyer.

6. The method of claim 1, wherein the demand forecast is based on a historical behavior.

7. The method of claim 6, wherein the historical behavior is factored by a predefined value to remove biasing.

8. The method of claim 1, further comprising reordering the item based on a rate of usage.

9. The method of claim 8, wherein the reordering step comprises:
   determining a new demand forecast based on the rate of usage of the item;
   calculating a new total cost for providing the item for each of the set of suppliers, wherein the new total costs are determined based on the fixed costs, the variable costs, the particular order specification and the new demand forecast; and
   identifying one of the set of suppliers for fulfilling an order for the item based on the one supplier having a lower new total cost for the item than the other suppliers.

10. The method of claim 1, wherein the item is one of a printed publication and a compact disc.

11. The method of claim 1, further comprising generating a report based on the componentized costs.

12. The method of claim 11, wherein the report comprises a ranking of the set of suppliers.

13. The method of claim 12, wherein the report comprises a hierarchical report of the set of suppliers.

14. A method for selecting a supplier, comprising:

receiving componentized costs for producing a single run of an item to be purchased over a plurality of runs from a plurality of suppliers, wherein the componentized costs include fixed costs for setting up the run and variable costs for producing each item according to various order specifications and order quantities;

providing a demand forecast and a particular order specification for the item;

determining based on the particular order specification, the demand forecast and the componentized costs with which of the plurality of suppliers should an order for the item be placed so that a total cost of the item is minimized over the plurality of runs; and determining an optimal order quantity for a run of the item based on the following algorithm:

$$N(2Cf/Cv/N)^{1/2}/1+0.232(Cf/Cv/N)^{0.49})$$

where N is the demand forecast, Cf are the fixed costs and Cv are the variable costs for the particular order specification, wherein the total costs over the plurality of runs are determined based on the optimal order quantity using the following algorithm:

$$M(Cf+no(Cv))$$

where M is an expected run quantity and no is the optimum order quantity for the run.

15. The method of claim 14, wherein the step of receiving componentized costs comprises:

collecting fixed costs and variable costs associated with raw materials for providing the item according to various order quantities and order specifications;

collecting fixed costs and variable costs associated with production for providing the item according to the various order quantities and the order specifications, wherein the fixed costs and the variable costs associated with the production are collected separately from the fixed costs and the variable costs associated with the raw materials; and approving the fixed costs and the variable costs associated with the raw materials and the fixed costs and the variable costs associated with the production.

16. The method of claim 15, farther comprising adjusting the collected variable costs associated with the raw materials based on current market costs.

17. The method of claim 14, wherein the demand forecast is an initial order quantity estimate as determined by a buyer.

18. The method of claim 14, wherein the demand forecast is an initial order quantity estimate as determined based on a historical behavior.

19. The method of claim 14, flirt her comprising reordering the item based on a rate of usage.

20. The method of claim 19, wherein the reordering step comprises:

determining a new demand forecast based on the rate of usage of the item;

calculating a new total cost for providing the item for each of the plurality of suppliers, wherein the new total costs are determined based on the fixed costs, the variable costs and the new demand forecast; and identifying one of the plurality of suppliers for fulfilling an order for the item based on the one supplier having a lower new total cost for the item than the other suppliers.

* * * * *